United States Patent [19]
Smith

[11] Patent Number: 5,634,853
[45] Date of Patent: Jun. 3, 1997

[54] SLIP YOKE ASSEMBLY FOR VEHICLE DRIVESHAFT

[75] Inventor: Johnny N. Smith, Toledo, Ohio

[73] Assignee: Dana Corporation, Toledo, Ohio

[21] Appl. No.: 578,907

[22] Filed: Dec. 27, 1995

[51] Int. Cl.$^6$ ........................................ F16C 3/03
[52] U.S. Cl. ............................. 464/162; 464/175
[58] Field of Search .......................... 464/172, 175, 464/182, 173, 183, 7, 16, 162, 133, 157; 403/51, 359

[56] References Cited

U.S. PATENT DOCUMENTS

| | | | |
|---|---|---|---|
| 2,116,290 | 5/1938 | Spicer | 464/162 |
| 2,806,365 | 9/1957 | Hennig | 464/16 X |
| 3,063,266 | 11/1962 | Rabson | 464/175 X |
| 3,754,411 | 8/1973 | Orain | 464/162 X |
| 4,475,737 | 10/1984 | Cook, Jr. et al. | |
| 4,844,486 | 7/1989 | Schiemann | |
| 5,094,894 | 3/1992 | Schafferus et al. | |
| 5,299,982 | 4/1994 | Burton | 464/162 X |
| 5,525,112 | 6/1996 | Smith | 464/162 |

FOREIGN PATENT DOCUMENTS

| | | | |
|---|---|---|---|
| 1265193 | 5/1961 | France | 464/162 |
| 2250568 | 6/1992 | United Kingdom | 464/162 |

*Primary Examiner*—Daniel P. Stodola
*Assistant Examiner*—Eileen A. Dunn
*Attorney, Agent, or Firm*—MacMillan, Sobanski & Todd

[57] ABSTRACT

A slip yoke assembly for a vehicle drive train assembly includes a yoke shaft having a shaft portion with a plurality of external splines formed thereon. A hollow transition member having a plurality of internal splines is connected to the yoke shaft for rotational driving movement, yet is permitted to move axially relative thereto. A hollow weld ring is secured to the yoke shaft for rotational movement therewith. The weld ring extends co-axially about the splined connection between the transition member and the shaft portion of the yoke shaft and provides an exterior surface to which one or more balance weights may be secured. The weld ting also provides an annular space to retain a quantity of lubricant for the splined connection. A flexible convoluted boot is provided to seal the splined connection between the transition member and the shaft portion of the yoke shaft. A first end of the boot is secured to the weld ring, while a second end of the boot is secured to the transition member. The boot prevents is contaminants from entering into the splined connection between the transition member and the shaft portion of the yoke shaft. A sleeve cup is also provided to seal the splined connection between the transition member and the shaft portion of the yoke shaft. The sleeve cup includes a circular body portion having a relatively short, axially extending flange portion. The circular body portion of the sleeve cup extends over the open end of the transition member to prevent contaminants from entering into the splined connection between the transition member and the shaft portion of the yoke shaft through the interior of the driveshaft section. The flange portion of the sleeve cup is frictionally engaged between the inner cylindrical surface of the driveshaft section and the outer cylindrical surface of the transition member to retain it in position during use.

9 Claims, 1 Drawing Sheet

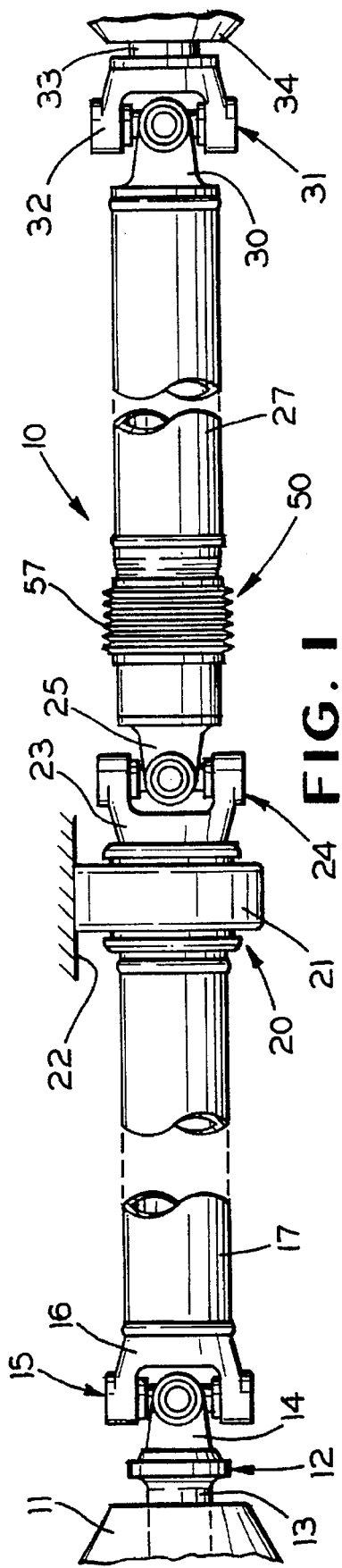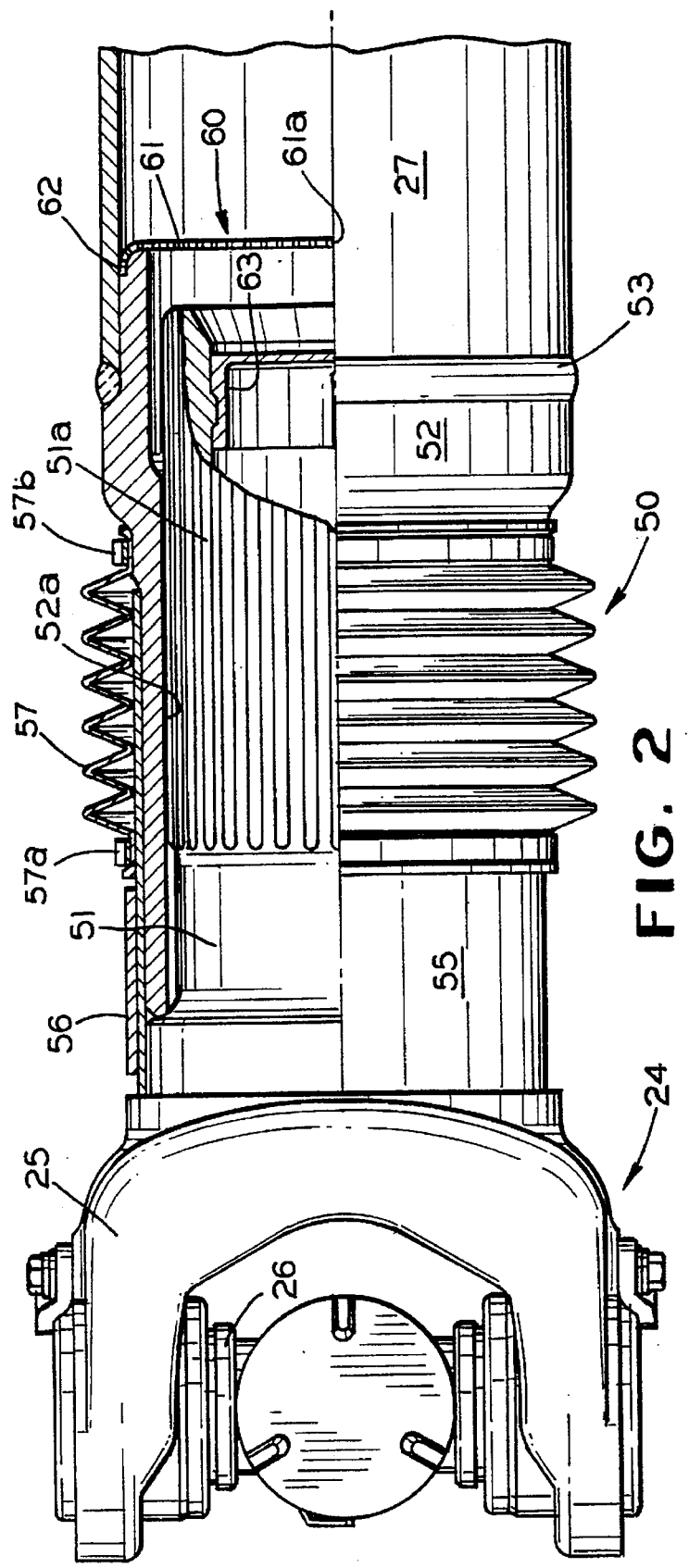

SLIP YOKE ASSEMBLY FOR VEHICLE DRIVESHAFT

BACKGROUND OF THE INVENTION

This invention relates in general to drive train assemblies for transferring rotational power from an engine to an axle assembly in a vehicle. In particular, this invention relates to an improved structure for a slip yoke assembly adapted for use in such a vehicle drive train assembly.

In most land vehicles in use today, a drive train assembly is provided for transmitting rotational power from an output shaft of an engine/transmission assembly to an input shaft of an axle assembly so as to rotatably drive one or more wheels of the vehicle. To accomplish this, a typical vehicular drive train assembly includes a hollow cylindrical driveshaft tube. A first universal joint is connected between the output shaft of the engine/transmission assembly and a first end of the driveshaft tube, while a second universal joint is connected between a second end of the driveshaft tube and the input shaft of the axle assembly. The universal joints provide a rotational driving connection from the output shaft of the engine/transmission assembly through the driveshaft tube to the input shaft of the axle assembly, while accommodating a limited amount of angular misalignment between the rotational axes of these three shafts.

Not only must the drive train assembly accommodate a limited amount of angular misalignment between the engine/transmission assembly and the axle assembly, but it must also typically accommodate a limited amount of axial movement therebetween. A small amount of such relative axial movement frequently occurs when the vehicle is operated. To address this, it is known to provide one or more slip yoke assemblies in the drive train assembly. A typical slip yoke assembly includes first and second splined members which are connected to respective components of the drive train assembly. The splined members provide a rotational driving connection between the components of the drive train assembly, while permitting a limited amount of axial misalignment therebetween. In some instances, the first splined member may be provided on the end of a yoke member connected to a universal joint assembly, while the second splined member may be connected to a driveshaft section of the drive train assembly.

As is well known in the art, most slip yoke assemblies are provided with sealing structures to prevent the entry of dirt, water, and other contaminants into the region where the splined members engage one another. Such contaminants can adversely affect the operation of the slip yoke assembly and cause premature failure thereof. A number of sealing structures are known in the art for use with conventional slip yoke assemblies. Both exterior and interior sealing structures must typically be provided to fully protect the region where the splined members engage one another. Exterior sealing structures are disposed on the outer surface of the slip yoke assembly and prevent contaminants from entering into this region from the exterior environment. For example, it is well known to provide an annular seal assembly on one of the splined members which slidably engages the other of the splined members. Typically, however, the surface which is slidably engaged by such an annular seal assembly must be carefully machined to provide a smooth sliding surface. Interior sealing structures are disposed within the slip yoke assembly and prevent contaminants from entering into this region through the hollow yokes or driveshaft sections connected to the splined members. For example, it is known to provide an internal plug to close the interior of a hollow yoke or driveshaft section. Typically, however, the plug must include a retaining mechanism of some sort to prevent it from becoming dislodged during use. These additional structures result in higher manufacturing and assembly costs for the slip yoke assembly. Thus, it would be desirable to provide an improved structure for a slip yoke assembly which is relatively simple and inexpensive in construction and assembly.

SUMMARY OF THE INVENTION

This invention relates to an improved structure for a slip yoke assembly adapted for use in a vehicle drive train assembly. The slip yoke assembly includes a yoke shaft having a shaft portion with a plurality of external splines formed thereon. The yoke shaft may be connected to a conventional universal joint assembly of the drive train assembly. A hollow transition member having a plurality of internal splines is disposed co-axially about the shaft portion of the yoke shaft such that the yoke shaft is connected to the transition member for rotational driving movement, yet is permitted to move axially relative thereto. The transition member may be secured to a driveshaft section of the drive train assembly. A hollow weld ring is secured to the yoke shaft for rotational movement therewith. The weld ring extends co-axially about the splined connection between the transition member and the shaft portion of the yoke shaft. The weld ring provides an exterior surface to which one or more balance weights may be secured to rotationally balance the slip yoke assembly during use. The weld ring also provides an annular space to retain a quantity of lubricant for the splined connection. A flexible convoluted boot is provided to seal the splined connection between the transition member and the shaft portion of the yoke shaft. A first end of the boot is secured to the weld ring, while a second end of the boot is secured to the transition member. The boot prevents contaminants from entering into the splined connection between the transition member and the shaft portion of the yoke shaft. The annular lubricant retaining space defined by the weld ring prevents the undesirable accumulation of lubricant in the flexible boot. A sleeve cup is also provided to seal the splined connection between the transition member and the shaft portion of the yoke shaft. The sleeve cup includes a circular body portion having a relatively short, axially extending flange portion. The circular body portion of the sleeve cup extends over the open end of the transition member, thereby preventing contaminants from entering into the splined connection between the transition member and the shaft portion of the yoke shaft through the interior of the driveshaft section. The flange portion of the sleeve cup is frictionally engaged between the inner cylindrical surface of the driveshaft section and the outer cylindrical surface of the transition member to retain it in position during use.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a side elevational view of vehicle drive train assembly including a slip yoke assembly in accordance with this invention for connecting a rearward end of a first driveshaft tube section to a forward end of a second driveshaft tube section.

FIG. 2 is an enlarged top plan view, partially in cross section, of the slip yoke assembly illustrated in FIG. 1

DETAILED DESCRIPTION OF THE PREFERRED EMBODIMENT

Referring now to the drawings, there is illustrated in FIGS. 1 and 2 a drive train assembly, indicated generally at 10, for a vehicle which is adapted to transmit rotational power from an engine/transmission assembly 11 to a plurality of driven wheels (not shown). The engine/transmission assembly 11 is conventional in the art and includes an externally splined output shaft (not shown) which is connected to a first slip yoke assembly, indicated generally at 12. The first slip yoke assembly 12 is conventional in the art and includes an internally splined tubular end portion 13 which slidably engages the externally splined output shaft of the engine/transmission assembly 11. As a result, the tubular end portion 13 of the first slip yoke assembly 12 is rotatably driven by the output shaft of the engine/transmission assembly 11, but is free to move axially relative thereto to a limited extent. The first slip yoke assembly 12 further includes a yoke 14, which forms one part of a first universal joint assembly, indicated generally at 15. The first universal joint assembly 15 is also conventional in the art and includes a tube yoke 16 which is connected to the yoke 14 by a cross in a known manner. The tube yoke 16 is secured, such as by welding, to a first end of a first driveshaft section 17 for rotation therewith. The first universal joint assembly 15 thus provides a rotational driving connection between the output shaft of the engine/transmission assembly 11 and the first driveshaft section 17, while permitting a limited amount of axial misalignment therebetween. Alternatively, the output shaft of the engine/transmission assembly 11 may terminate in a conventional end yoke (not shown) which is directly connected to the cross of the first universal joint assembly 15.

The first driveshaft section 17 extends through and is supported for rotation by a center bearing assembly, indicated generally at 20. The center bearing assembly 20 is conventional in the art and includes a rigid frame or bracket 21 which is secured to a portion of a frame, chassis, or body 22 of the vehicle. The first driveshaft section 17 terminates in a second end including a end yoke 23, which forms one part of a second universal joint assembly, indicated generally at 24. The second universal joint assembly 24 is also conventional in the art and includes a yoke shaft 25 which is connected to the end yoke 23 by a cross 26 (see FIG. 2) in a known manner. The yoke shaft 25 is, in turn, connected through a second slip yoke assembly, indicated generally at 50, to a first end of a second driveshaft section 27. The second universal joint assembly 24 thus provides a rotational driving connection between the first driveshaft section 17 and the second driveshaft section 27, while permitting a limited mount of axial misalignment therebetween. The structure and operation of the second slip yoke assembly 50 will be described in detail below.

The second driveshaft section 27 terminates in a second end having a tube yoke 30 secured thereto. The tube yoke 30 forms one part of a third universal joint assembly 31. The third universal joint assembly 31 is also conventional in the art and includes a tube yoke 32 which is connected to an input shaft 33 of an axle assembly 34 by a cross in a conventional manner. The third universal joint assembly 31 thus provides a rotational driving connection between the second driveshaft section 27 and the input shaft 33 of the axle assembly 34, while permitting a limited amount of axial misalignment therebetween. The axle assembly 34 is conventional in the art and is adapted to transmit rotational power from the input shaft 33 to the driven wheels of the vehicle in a known manner.

Referring now to FIG. 2, the structure of the second slip yoke assembly 50 is illustrated in detail. As shown therein, the yoke shaft 25 includes a cylindrical shaft portion 51 having a plurality of splines 5 la formed on the outer surface thereof. A hollow cylindrical transition member 52 is disposed co-axially about the shaft portion 51. The transition member 52 has a plurality of splines 52a formed on an inner surface thereof which cooperate with the external splines formed on the shaft portion 51 of the yoke shaft 25. As a result, the yoke shaft 25 is connected to the transition member 52 for rotational driving movement, yet is permitted to move axially relative thereto. The transition member 52 is secured to the second driveshaft section 27, such as by a weldment 53, for rotational movement therewith.

A hollow cylindrical weld ring 55 is secured to the yoke shaft 25 for rotational movement therewith. As shown in FIG. 2, the weld ring 55 may be secured to the yoke shaft 25 by press fitting it on a shoulder provided on the yoke shaft 25. However, the weld ring 55 may be secured to the yoke shaft 25 in any other desired manner. The weld ring 55 extends co-axially about the splined connection between the transition member 52 and the shaft portion 51 of the yoke shaft 25. The weld ring 55 provides an exterior surface to which one or more balance weights 56 may be secured to rotationally balance the slip yoke assembly during use. The weld ring 55 also functions to define a relatively small annular space about the transition member 52, for a purpose which will be explained below.

A flexible convoluted boot 57 is provided as an exterior seal structure to seal the splined connection between the transition member 52 and the shaft portion 51 of the yoke shaft 25. As shown in FIG. 2, a first end of the flexible boot 57 is secured to the weld ring 55, such as by a conventional band clamp 57a. Similarly, a second end of the flexible boot 57 is secured to the transition member 52, such as by a conventional band clamp 57b. The boot 57 prevents dirt, water, and other contaminants from entering into the splined connection between the transition member 52 and the shaft portion 51 of the yoke shaft 25. During use, the yoke shaft 25 may move axially relative to the second driveshaft section 27. When such relative axial movement occurs, the boot 57 will expand and contract axially to accommodate such movement, while continuing to provide the desired sealing action.

As mentioned above, the weld ring 55 defines a relatively small annular space about the transition member. Typically, a quantity of lubricant is injected into the region of the splined connection between the transition member 52 and the shaft portion 51 of the yoke shaft 25 to facilitate relative axial movement. Any lubricant which escapes from the region of the splined connection will be trapped in the annular space defined between the weld ring 55 and the transition member 52. The retention of lubricant in this annular space is desirable because it reduces the amount of lubricant which would otherwise move into the region of the flexible boot 57. The accumulation of lubricant in the region of the flexible boot 57 is undesirable because it can cause ballooning of the flexible boot 57 when rotated at high speeds.

A sleeve cup, indicated generally at 60, is provided as an interior seal structure to seal the splined connection between the transition member 52 and the shaft portion 51 of the yoke shaft 25. As shown in FIG. 2, the sleeve cup 60 includes a circular body portion 61 having a relatively short, axially extending flange portion 62. The circular body portion 61 of the sleeve cup 60 extends over the open end of the transition member 52, thereby preventing dirt, water, and other contaminants from entering into the-splined connection between the transition member 52 and the shaft portion 51 of the yoke shaft 25 through the interior of the second driveshaft section 27. A central opening 61a may be formed through the circular body portion 61 of the sleeve cup 60. The central opening functions as a vent to prevent trapped air within the region of the splined connection between the transition member 52 and the shaft portion 51 of the yoke shaft 25 from causing ballooning of the flexible boot 57 when relative axial movement occurs.

The flange portion 62 of the sleeve cup 60 is retained within the slip yoke assembly 10 by frictional engagement between the inner cylindrical surface of the second driveshaft section 27 and the outer cylindrical surface of the transition member 52. The sleeve cup 60 can-be installed by initially disposing it about the end of the transition member 52, then moving the second driveshaft section 27 axially thereabout. Once the second driveshaft section 27 is secured to the transition member 52, the sleeve cup 60 will be permanently retained thereon. In this manner, the sleeve cup 60 can be quickly and easily installed without the use of special tools or other mounting structures.

Lastly, a plug 63 is also provided as an interior seal structure to seal the splined connection between the transition member 52 and the shaft portion 51 of the yoke shaft 25. As shown in FIG. 2, the plug 63 is conventional in the art and is generally cup-shaped. The plug 63 is press fit into the open end of the shaft portion 51 of the yoke shaft 25 to prevent dirt, water, and other contaminants from entering into the splined connection between the transition member 52 and the shaft portion 51 of the yoke shaft 25 through the interior of the yoke shaft 25.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A slip yoke assembly for a vehicle drive train assembly comprising:

a yoke shaft having an externally splined shaft portion;

a transition member having a hollow internally splined portion disposed co-axially about said shaft portion of said yoke shaft for rotational driving movement therewith and for axial movement relative thereto;

a hollow weld ring secured to said yoke shaft for rotational movement therewith, said weld ring extending co-axially about portions of said transition member and said yoke shaft, said weld ring slidably engaging portions of said transition member so as to define an annular space between said yoke shaft, said transition member, and said weld ring; and a boot having a first end secured to said weld ring and a second end secured to said transition member.

2. The slip yoke assembly defined in claim 1 further including a universal joint assembly connected with said yoke shaft.

3. The slip yoke assembly defined in claim 1 further including a universal joint assembly connected with said transition member.

4. The slip yoke assembly defined in claim 1 further including a first universal joint assembly connected with said yoke shaft and a second universal joint assembly connected with said transition member.

5. The slip yoke assembly defined in claim 1 wherein said weld ring is secured to said yoke shaft in a press fit engagement.

6. The slip yoke assembly defined in claim 1 wherein said boot is a flexible convoluted boot.

7. The slip yoke assembly defined in claim 1 wherein said first end of said flexible boot is secured to said weld ring by a band clamp.

8. The slip yoke assembly defined in claim 1 wherein said second end of said flexible boot is secured to said transition member by a band clamp.

9. The slip yoke assembly defined in claim 1 wherein said first end of said flexible boot is secured to said weld ring by a conventional band clamp and said second end of said flexible boot is secured to said transition member by a band clamp.

* * * * *